United States Patent

Bavard

Patent Number: 5,508,907
Date of Patent: Apr. 16, 1996

[54] CHOPPER CONTROL APPARATUS

[75] Inventor: Jean Bavard, Lyon, France

[73] Assignee: GEC Alsthom Transport SA, Paris, France

[21] Appl. No.: 166,010

[22] Filed: Dec. 14, 1993

[30] Foreign Application Priority Data

Dec. 15, 1992 [FR] France ............... 92 15081

[51] Int. Cl.$^6$ .................................................. H02M 3/02
[52] U.S. Cl. ............................................ 363/124; 363/78
[58] Field of Search ........................... 363/124, 78, 81, 363/95; 323/265, 273, 282

[56] References Cited

U.S. PATENT DOCUMENTS

| | | | |
|---|---|---|---|
| 3,958,173 | 5/1976 | Christianson et al. | 321/45 C |
| 4,246,522 | 1/1981 | Bourke et al. | 318/338 |
| 4,580,089 | 4/1986 | Grunsch et al. | |
| 4,835,454 | 5/1989 | White | 323/222 |

FOREIGN PATENT DOCUMENTS 3619256 12/1987 Germany.
2134291 8/1984 United Kingdom.

*Primary Examiner*—Peter S. Wong
*Assistant Examiner*—Adolf Berhane
*Attorney, Agent, or Firm*—Sughrue, Mion, Zinn, Macpeak & Seas

[57] ABSTRACT

A chopper control apparatus including a measurement device which measures the mean value of an output magnitude of the chopper, and a regulator which controls the supply of control square-waves for the chopper on the basis of measurement results supplied by the measurement device and a reference magnitude, so as to make the mean value equal to the reference magnitude. The measurement device includes a device which generates a sampling signal having pulses whose positions, relative to the control square-waves, are determined so that the pulses coincide with the output magnitude passing through its mean value. The measurement device further includes a sampling device which samples the output magnitude based on the sampling signal.

11 Claims, 3 Drawing Sheets

CHOPPER CONTROL APPARATUS

BACKGROUND OF THE INVENTION

1. Field of the Invention

The present invention relates to chopper control apparatus.

2. Description of the Related Art

A chopper is a device fed with a DC input magnitude (voltage or current), and including at least one power-switch component that is opened or closed so as to set the mean value for an output magnitude (current or voltage) of the device, the on duration of said switch component being defined by the width of control square-waves which are applied to it, and the rate of the square-waves setting the operating rate of the chopper.

To control a chopper circuit, the following steps are performed:

measuring the mean value of the output magnitude of the chopper; and regulation calculation for determining the width of the control square-waves to be applied to said switch, so as to make said mean value equal to a determined reference magnitude.

In general, these mean value measurement and regulation calculation steps are performed at the operating frequency of the chopper, and, in general, said control square-waves are further generated by setting one of the control instants (opening or closing) of said switch, the other instant being controlled as a function of the results of said regulation calculation.

A problem arises when measuring the mean value of the output magnitude of the chopper: the harmonics due to the chopping must be removed from the output magnitude. In general, this problem is solved by performing filtering, which may be digital or analog.

A major drawback of such filtering is that it results in a relatively long time being required for acquiring the mean value (which time, added to the regulation calculation time, means that the result of the calculation is, in general, applied one period late). Another major drawback of such filtering is that, depending on whether the filtering is analog or digital, it is complex to implement or it gives rise to a limitation in the passband (because of the pre-filtering step that is necessary to avoid the phenomenon of spectrum folding by sampling of the output magnitude, which phenomenon is due to the digital processing the output magnitude).

SUMMARY OF THE INVENTION

A main object of the invention is to avoid the above-mentioned drawbacks.

The present invention provides chopper control apparatus including measurement means for measuring the mean value of an output magnitude of said chopper, and regulation means which control the supply of control square-waves for the chopper on the basis of measurement results supplied by said measurement means and of a reference magnitude, so as to make said mean value equal to said reference magnitude, said apparatus essentially being characterized in that said measurement means include:

means for generating a sampling signal having pulses whose positions, relative to said control square-waves, are determined so that said pulses coincide with said output magnitude passing through its mean value; and sampling means for sampling said output magnitude by means of said sampling signal.

BRIEF DESCRIPTION OF THE DRAWINGS

Other objects and characteristics of the present invention will appear on reading the following description of embodiments given with reference to the accompanying drawings, in which.

DETAILED DESCRIPTION OF THE PREFERRED EMBODIMENTS

Figure 1:
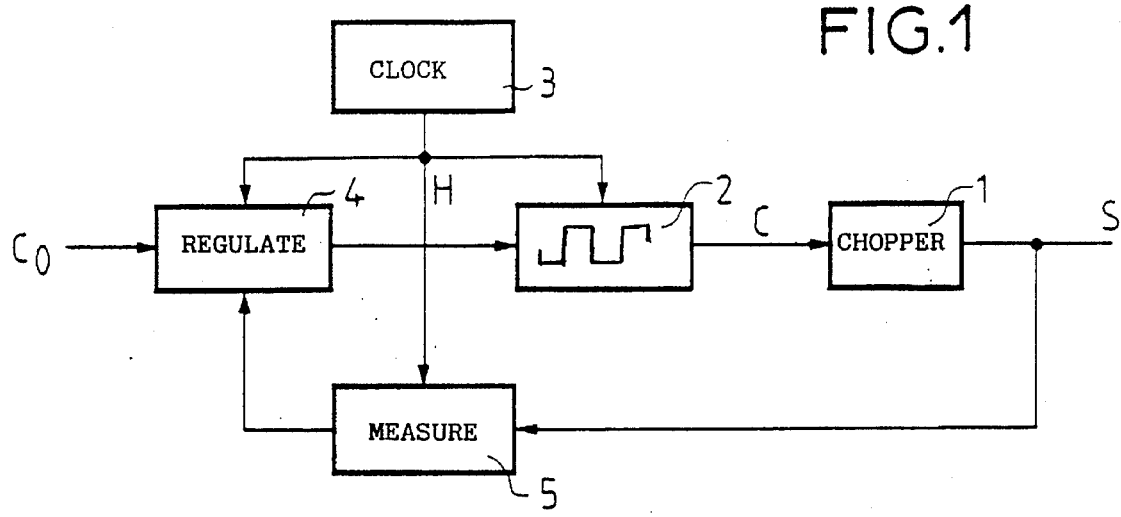
FIG. 1 is a block diagram of an embodiment of chopper control apparatus of the invention.

FIG. 1 shows a chopper 1 controlled by a control square-wave generator 2 itself receiving firstly a clock signal H from a clock 3, whose period T sets the operating period of the chopper, and secondly a control signal from regulation means 4 which themselves operate (in known manner not described below) on the basis of a reference magnitude Co and of results supplied by measurement means 5 for measuring the mean value of the output magnitude S of the chopper 1, so as to make said mean value equal to said reference value.

In accordance with the invention, said measurement means 5 consist of a single sampler for sampling the output magnitude S by means of a sampling signal having pulses whose positions, relative to said control square-waves, are determined so that the pulses coincide with the output magnitude of the chopper passing through its mean value.

By way of example, in the case of an output magnitude obtained in a "first-order" system, i.e. a system composed merely either of a resistor and of an inductor (the output magnitude then being constituted by the current in the inductor), or else of a resistor and of a capacitor (the output magnitude then being constituted by the voltage across the terminals of the capacitor), the relative positions of said control square-waves and of said sampling pulses are determined so that the pulses coincide with the middles of said control square-waves.

In the embodiment shown in FIG. 1, said sampling signal is constituted by the clock signal H of period T setting the operating period of the chopper.

Figure 2:
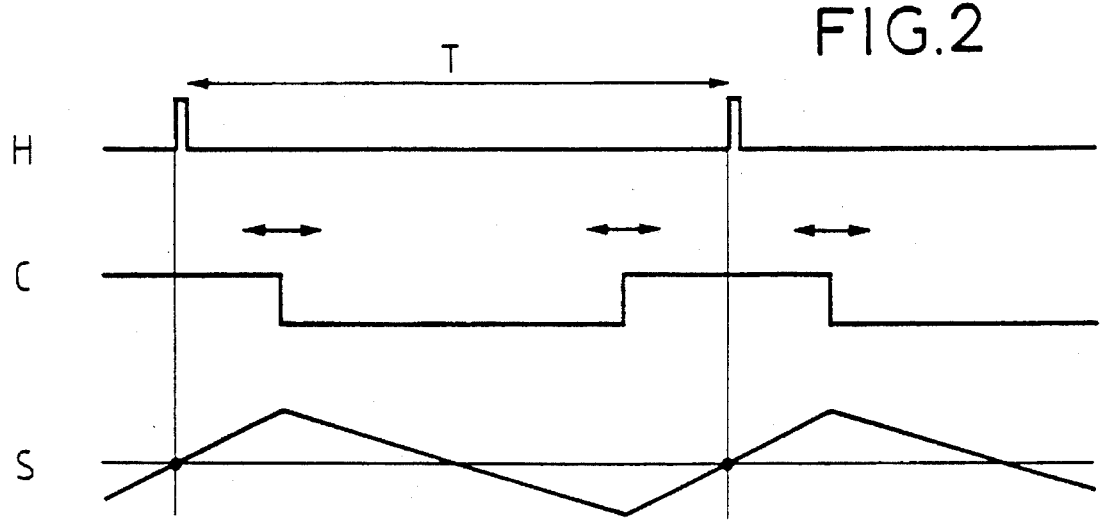
FIGS. 2 to 5 are timing diagrams showing various examples of operation of control apparatus of the invention.

The operation of the FIG. 1 apparatus is shown in the timing diagram of FIG. 2. As shown in FIG. 2, the control square-waves C (shown on the second line of the timing diagram) have their positions controlled, relative to the fixed positions of the pulses of the sampling clock H (shown on the first line of the timing diagram), so that the sampling pulses coincide with the output magnitude S (shown on the third line of the timing diagram) passing through its mean value, i.e. with the middles of the control square-waves, since the output magnitude is assumed to be a first-order magnitude in this example.

Figure 3:
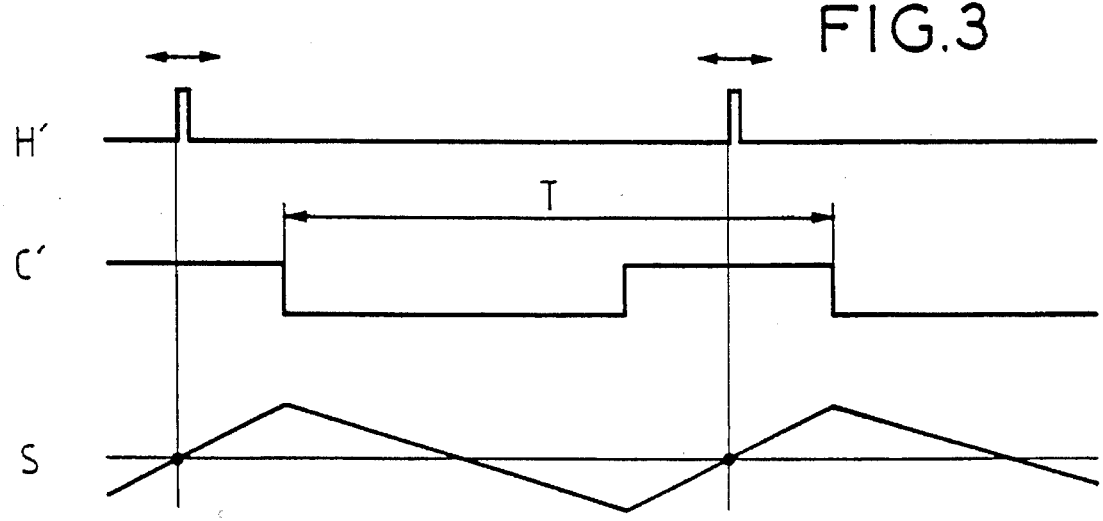

In the example of operation shown in the timing diagram of FIG. 3, the pulses of the sampling signal H' have their positions controlled relative to the fixed positions of one of the edges (rising edge or falling edge) of each of the control square-waves C', i.e. of one of the control instants (opening or closing) of said power switch, so that the sampling pulses likewise coincide with the output magnitude S passing through its mean value, i.e. with the middles of the control square-waves, since the output magnitude is also assumed to be a first-order magnitude in this example.

The example of operation shown in FIG. 2 requires the control square-wave generator 2 to be appropriately controlled by the regulation means 4, whereas the example of operation shown in FIG. 3 requires a sampling pulse generator to be appropriately controlled by the regulation means 4.

In the example of operation in FIG. 2, once the width of the control square-waves has been determined (in conventional manner) by performing regulation calculation, said appropriate control consists in controlling the positioning of the rising edges and the falling edges of the control square-waves relative to the pulses of the sampling clock that is also received by said regulation means, so as to comply with said width.

In the example of operation in FIG. 3, once the width of the control square-waves has been determined (in conventional manner) by performing regulation calculation, said appropriate control consists in controlling the positioning of the pulses of the sampling signal relative to one of the edges (rising edge or falling edge) of each of said control square-waves, the rate of the edge itself being fixed by a clock signal of period T that is also received by said regulation means, so as to comply with said width.

Since the output magnitude S passes through its mean value twice per operating period of the chopper, the invention further advantageously enables the steps of measurement and of regulation calculation to be performed at a frequency of twice the operating frequency of the chopper (and not merely at the operating frequency of the chopper, as shown in FIGS. 2 and 3), and better performance levels can therefore be obtained for said chopper control in terms of passband and reaction times relative to disturbances.

Figure 4:
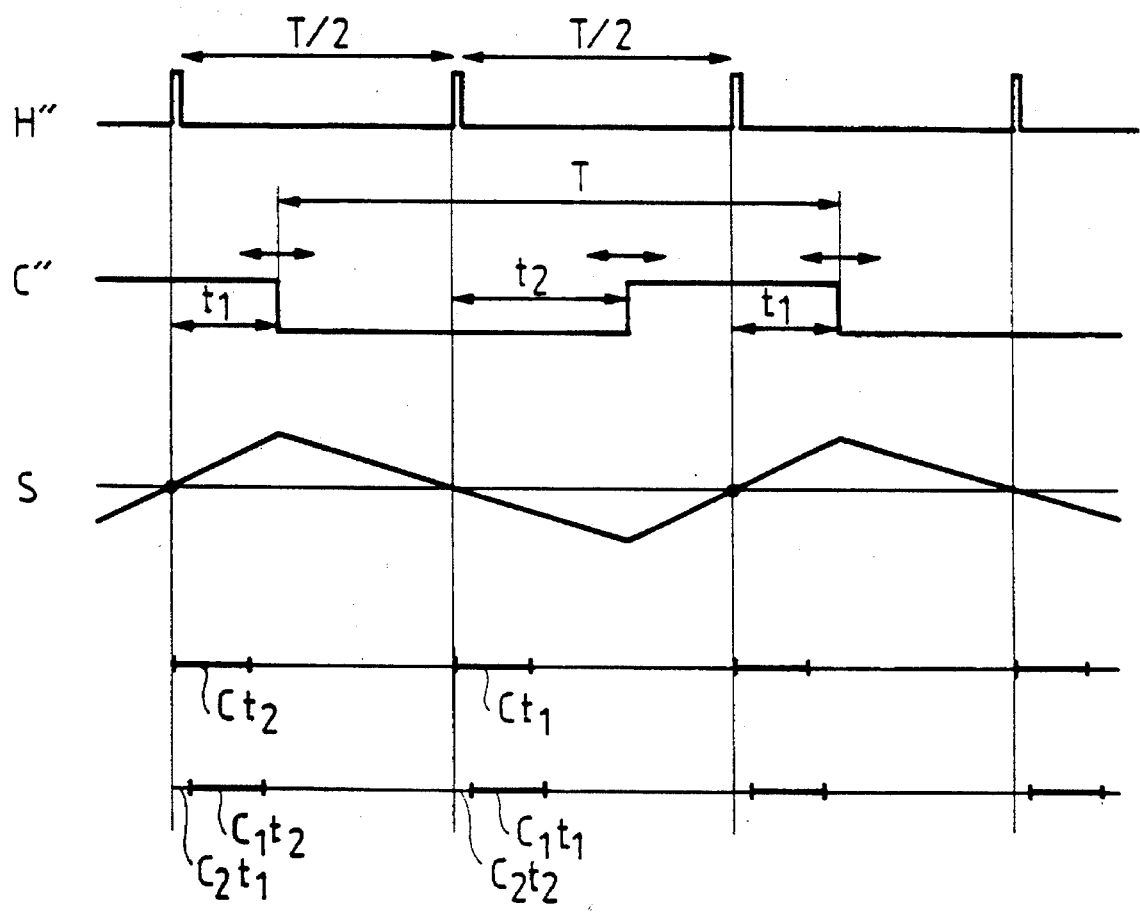

Such a variant is shown in FIG. 4, in which a sampling signal referenced H" is considered. In this variant, said sampling signal has fixed-position pulses at twice the frequency of clock signal H. To control the positions of the control square-waves, referenced C", relative to said sampling pulses, action is taken by appropriately controlling the control square-wave generator via the regulation means, the action being taken alternately on the position $t_2$ of the rising edge of a square-wave, relative to the sampling instant immediately preceding that edge, and on the position $t_1$ of the falling edge of the square-wave, relative to the following sampling instant.

Once the width of the control square-waves has been determined (in conventional manner) by performing regulation calculation, said appropriate control consists in controlling the positioning of the rising edges and the falling edges of the control square-waves relative to the pulses of the sampling clock signal H" that is also received by said regulation means, so as to comply with said width.

By applying the current value of parameter $t_1$ while the next value of parameter $t_2$ to be applied is being calculated, and vice versa, (as shown on the penultimate line of the timing diagram in FIG. 4, where the respective calculation cycles for the parameters $t_1$ and $t_2$ are referenced $Ct_1$ and $Ct_2$), the delay in applying the values obtained from the regulation calculation is reduced, thereby further improving the performance levels of the chopper control apparatus in terms of passband and reaction times relative to disturbances.

With the microprocessors that are in common use, the entire calculation of the value $t_1$ or $t_2$ takes longer than half the minimum value of a control square-wave for controlling the chopper. The calculation consists in calculating a polynomial expressed in the following form:

$$s(n)=C_o e(n)+C_1 e(n-1)+C_2 e(n-2)+\ldots+C_k s(n-1)$$

where $C_o$, $C_1$, $C_2$, and $C_k$ designate determined coefficients, e(n) designates the last measurement result obtained, e(n−1), e(n−1), ..., etc. designate the measurement results obtained previously, and s(n−1) designates the preceding value of such a polynomial obtained by calculation.

The delay in applying the values obtained by the regulation calculations may be reduced still further by limiting the regulation calculation performed after a measurement to calculation of that one of the terms of the polynomial which requires the result of the measurement to be taken into account, and by calculating the other terms of the polynomial in advance.

It then becomes possible to apply the value $t_1$ or $t_2$ resulting from the regulation calculation immediately, i.e. to the current measurement-regulation calculation cycle.

Such a variant is shown on the last line of the timing diagram in FIG. 4, where the references $C_1 t_1$ and $C_1 t_2$ designate the respective portions of the calculations of the parameters $t_1$ and $t_2$ performed in advance, and the references $C_2 t_1$ and $C_2 t_2$ designate the respective portions of the calculations of those parameters not performed in advance.

It should be noted that such an immediate application would not be possible in prior chopper control systems because the sum of the calculation times devoted both to filtering (itself enabling said mean value measurement to be taken, as recalled above), and also to regulation, require those systems to apply each value one period late.

Although the above-described examples of operation correspond more particularly to the output magnitude being obtained in a "first-order" system, the present invention is not limited to a first-order system: it also applies to higher-order systems.

Figure 5:
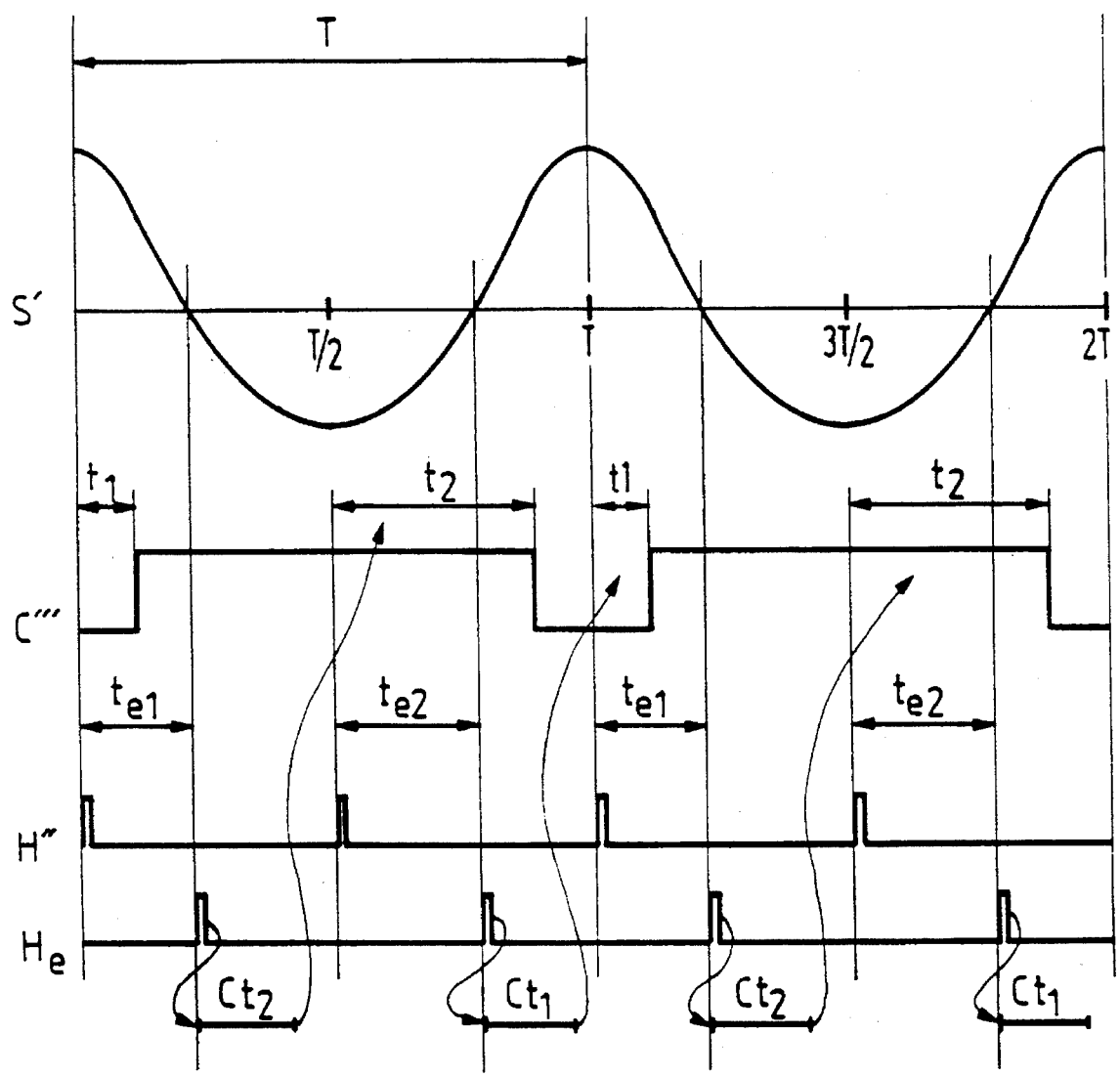

The case of a "second-order" system (i.e. including all of the following components: a resistor, an inductor, and a capacitor) is shown in FIG. 5 which corresponds, by way of example, like FIG. 4, to "double-frequency" operation, and in which the waveforms referenced C" and S in FIG. 4 are referenced C'" and S', and the sampling signal of the output magnitude is referenced He.

In the case of a second-order system, the output magnitude is equal to its mean value at instants referenced $te_1$ and $te_2$ (where $te_2=T/2-te_1$), the values $te_1$ and $te_2$ varying as a function of the duty ratio in a determined variation relationship. The sampling instants may then be calculated in advance, using said relationship, and stored in a memory. It is also possible to calculate them in real time using an approximate relationship of the trigonometric type or of the second-degree polynomial type.

As explained in the case of FIG. 4, the regulation calculation may be performed after the magnitude measurement has been taken, and the regulation calculation result ($t_1$ or $t_2$) may be applied in the following half-period.

More generally, in the case of odd "n" order systems (where n is an integer greater than 1), the principles described above for the case of a first-order system may be applied.

In the case of even "n" order systems (where n is an integer greater than 2), the principles described above for the case of a second-order system may be applied, but in practice, it is possible to take sampling instants $te_1$ and $te_2$ situated at T/4 relative to the middles of the control square-waves of the chopper, because the ideal sampling instants are very close thereto, and the error is therefore negligible.

It should also be noted that the present invention also applies to an "equivalent" chopper resulting from interlacing a plurality of choppers. In known manner (not recalled below) such interlacing makes it possible for the equivalent chopper to have an operating frequency equal to "m" times the operating frequency of a single one of the interlaced choppers, where "m" designates the number of interlaced choppers.

I claim:

1. A chopper control apparatus including a measurement device which measures the mean value of an output magnitude of said chopper, and a regulator which controls the supply of control square-waves for the chopper on the basis of measurement results supplied by said measurement device and a reference magnitude, so as to make said mean value equal to said reference magnitude, said measurement device comprising:

a device which generates a sampling signal having pulses whose positions, relative to said control square-waves, are determined so that said pulses coincide with said output magnitude passing through its mean value; and a sampling device which samples said output magnitude based on said sampling signal.

2. An apparatus according to claim 1, wherein said sampling signal generating device includes a device which generates said sampling signal whose pulses have fixed positions, and a device which controls the positions of said control square-waves relative to the positions of said sampling pulses, so that the sampling pulses coincide with the output magnitude passing through its mean value.

3. An apparatus according to claim 1, wherein said sampling signal generating device includes a device which generates control square-waves, each of which having one of its edges in a fixed position, and a device which controls the positions of the pulses of said sampling signal so that said pulses coincide with the output magnitude passing through its mean value.

4. An apparatus according to claim 1, wherein when said output magnitude is obtained in a "first-order" system or in an "n-order" system, wherein $\underline{n}$ is odd and greater than 1, said sampling signal generating device includes a device which generates a sampling signal having pulses whose positions, relative to said control square-waves, are determined so that said sampling pulses coincide with the middles of said control square-waves.

5. An apparatus according to claim 1, wherein when said output magnitude is obtained in a "second-order" system, said sampling signal generating device includes a device which generates a sampling signal having pulses whose positions, relative to said control square-waves, are determined so that said sampling pulses vary as a function of the duty ratio in a determined variation relationship.

6. An apparatus according to claim 1, wherein when said output magnitude is obtained in an "n-order" system, wherein n is even and greater than 2, said sampling signal generating device includes a device which generates a sampling signal having pulses whose positions, relative to said control square-waves, are determined so that said sampling pulses are situated at T/4 relative to the middles of said control square-waves, where T designates the operating period of the chopper.

7. An apparatus according to claim 1, wherein the frequency of said sampling pulses is equal to the frequency of said control square-waves.

8. An apparatus according to claim 1, wherein the frequency of said sampling pulses is twice that of said control square-waves, and said sampling signal generating device includes a device which generates a sampling signal whose pulses have fixed positions, and a device which controls the positions of the rising edges and the falling edges of said control square-waves relative to the positions of said sampling pulses, so that the sampling pulses coincide with the output magnitude passing through its mean value.

9. An apparatus according to claim 8, wherein said regulator regulates at a frequency that is twice the frequency of said control square-waves.

10. An apparatus according to claim 9, wherein said regulator includes a calculation device which determines the position of rising edges and falling edges of said control square-waves, said calculation device determines the positions of the falling edges of said control square-waves while the rising edges of said control square-waves are being applied to the chopper, and vice versa.

11. An apparatus according to claim 9, wherein said regulator calculates a polynomial at a given "regulation" frequency, where one of the terms of the polynomial is a function of the value of the polynomial for the regulation period preceding the regulation period in question, another term of the polynomial is a function of the measurement result obtained for the sampling instant corresponding to the regulation period in question, and the other terms of the polynomial are functions of the measurement results obtained at preceding sampling instants, said regulator includes a calculator which calculates firstly, for the regulation period in question, that one of said terms which is a function of the measurement result obtained for the sampling instant corresponding to the regulation period in question, and secondly, for the following regulation period, said other terms in advance.

* * * * *